(12) United States Patent
Cordery

(10) Patent No.: US 6,738,899 B1
(45) Date of Patent: *May 18, 2004

(54) METHOD FOR PUBLISHING CERTIFICATION INFORMATION CERTIFIED BY A PLURALITY OF AUTHORITIES AND APPARATUS AND PORTABLE DATA STORAGE MEDIA USED TO PRACTICE SAID METHOD

(75) Inventor: Robert A. Cordery, Danbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/280,527

(22) Filed: Mar. 30, 1999

(51) Int. Cl.$^7$ .............. H04L 9/30; H04L 9/28; G06F 1/24; G06F 15/20

(52) U.S. Cl. ............ 713/156; 713/157; 713/171; 705/60; 705/61; 705/64; 380/30; 380/55; 380/282; 380/286

(58) Field of Search .............. 705/40–410; 713/157, 713/171, 156; 380/30, 55, 286, 282

(56) References Cited

U.S. PATENT DOCUMENTS

| | | | |
|---|---|---|---|
| 4,796,193 A | * 1/1989 | Pitchenik | 380/23 |
| 4,853,961 A | 8/1989 | Pastor | |
| 5,214,702 A | * 5/1993 | Fischer | 380/30 |
| 5,420,927 A | * 5/1995 | Micali | 380/23 |
| 5,442,707 A | 8/1995 | Miyaji et al. | |
| 5,497,423 A | 3/1996 | Miyaji | |
| 5,588,061 A | * 12/1996 | Ganesan et al. | 380/30 |
| 5,604,804 A | * 2/1997 | Micali | 380/25 |
| 5,610,982 A | * 3/1997 | Micali | 380/25 |
| 5,661,803 A | 8/1997 | Cordery et al. | |
| 5,680,456 A | 10/1997 | Baker et al. | |
| 5,737,419 A | 4/1998 | Ganesan | 380/21 |
| 5,742,682 A | 4/1998 | Baker et al. | |
| 5,805,701 A | 9/1998 | Ryan, Jr. | |
| 5,867,578 A | 2/1999 | Brickell et al. | 380/30 |
| 5,878,136 A | 3/1999 | Kim et al. | |
| 5,982,896 A | 11/1999 | Cordery et al. | |
| 6,041,704 A | 3/2000 | Pauschinger | |
| 6,175,827 B1 | 1/2001 | Cordery et al. | |
| 6,212,281 B1 | * 4/2001 | Vanstone | 380/282 |
| 6,295,359 B1 | 9/2001 | Cordery et al. | |
| 6,336,188 B2 | * 1/2002 | Blake-Wilson et al. | 713/171 |
| 6,341,349 B1 | * 1/2002 | Takaragi et al. | 713/168 |
| 6,411,716 B1 | * 6/2002 | Brickell | 380/286 |
| 6,418,422 B1 | * 7/2002 | Guenther et al. | 705/401 |
| 6,424,712 B2 | * 7/2002 | Vanstone et al. | 380/28 |

FOREIGN PATENT DOCUMENTS

EP 0 892 520 A2 1/1999

OTHER PUBLICATIONS

EIC NPL seach on postage meter and publick key encryption technology enclosed.*
Ravi gansan, Yaksha: Augmenting Kerberos with public Key Cryptography, Network and Distributed System Security, 1995, Symposium, pp. 132–143.*
Menezes et al., Handbook of Applied Cryptography, CRC Press, LLC, 1997, pp 5220–522 and 562–566.*
Kerstetter, Jim; Stamping Out Fraud; Jul. 13, 1998; PC Week v15, n28, p14(1), dialog copy.
EIC NPL seach on postage meter and publick key encryption technology enclosed.

* cited by examiner

Primary Examiner—Ayaz Sheikh
Assistant Examiner—Taghi Arani
(74) Attorney, Agent, or Firm—Charles R. Malandra, Jr.; Angelo N. Chaclas

(57) ABSTRACT

A method for certifying the public key of a user wishing to communicate using a public key encryption system by a plurality of certifying authorities. A plurality of certifying stations and a user station exchange information and the user station derives a public key from the exchanged information. The certifying stations also publish related information and their public keys. A third party can derive the public key corresponding to the user's private key by operating on the published information with a summation of the certifying station keys.

20 Claims, 7 Drawing Sheets

METHOD FOR PUBLISHING CERTIFICATION INFORMATION CERTIFIED BY A PLURALITY OF AUTHORITIES AND APPARATUS AND PORTABLE DATA STORAGE MEDIA USED TO PRACTICE SAID METHOD

RELATED APPLICATION

The present application is related to, and discloses subject matter common to commonly assigned, co-pending application Ser. No. 09/280,529, filed on even date herewith.

BACKGROUND OF THE INVENTION

The subject invention relates to encryption of information using public key encryption technology. (By "public key" encryption herein is meant encryption technology which uses pairs of keys: a public key, which is published or made publicly known; and a corresponding private key, kept secret by a user.) More particularly it relates to the certification of public keys by a plurality of certifying authorities.

Using public key encryption anyone can encrypt a message with a public key and have assurance that only a user (i.e. a party having the corresponding private key) can decrypt it, and a user can "sign" a message using the corresponding private key and anyone can use the public key to ascertain if the message originated with the user. (A message is "signed" by deriving encrypted information in a known manner from the message.)

Because public keys can be distributed so widely, it will in general be the case that persons communicating with users of public key systems will not be in direct contact with the users and will not be able to directly determine the identity and/or characteristics of the putative users of a public key system. For example a vendor who receives a purchase order signed by the user of a public key which is purportedly that of an authorized agent of the buyer may need to know, but have no way of directly determining, the actual authority of the user. Similarly proof of payment systems, in particular postage meters, which generate indicia encrypted using public key systems as proof of payment have recently been developed by the assignee of the present application and others; and, given the hundreds of thousands of postage meters in service, it is clear that the postal services will face a severe problem in assuring that indicia purportedly generated by a meter corresponding to a particular public key is in fact generated by an authorized postage meter.

To overcome the difficulties inherent in authenticating public keys numerous schemes for issuing certificates for public keys have been proposed. In such schemes, a trusted third party (hereinafter sometimes a "certifying authority") provides parties who wish to communicate with a user with a certificate containing the user's public key, the certificate serving to evidence the third party's assurances as to the identity or characteristics of the user. In the simplest case such certificates are no more than entries in a directory delivered through a secure channel. More generally the certifying authority will use an encryption technology to deliver the certificate.

In U.S. Pat. No. 4,853,961; for: "Reliable Document Authentication System"; to: Pastor, a public key for a postage meter is encrypted with a third party's private key and included in the meter indicia. The postal service uses the third party's public key to recover the meter public key and decrypt the encrypted message which serves to validate the indicia.

In U.S. Pat. No. 5,661,803; for: "Method of Token Verification in a Key Management System"; to: Cordery et al., a method of token verification in a key management system is disclosed.

In U.S. Pat. No. 5,680,456; for: "Method of Manufacturing Generic Meters in a Key Management System"; to: Baker et al., a method for manufacturing transaction evidencing devices such as postage meters includes the steps of generating a master key in a logical security domain of a key management system and installing the master key in a postage meter.

In U.S. Pat. No. 5,742,682; for: "Method of Manufacturing Secure Boxes in a Key Management System"; to: Baker et al., a method of manufacturing a secure box in a key management system is taught.

In U.S. Pat. No. 5,805,701; for: "Enhanced Encryption Control System for a Mail Processing System Having Data Center Verification"; to: Ryan, Jr., a key control system comprising generation of a first set of master keys and assigning the keys to a corresponding plurality of postage meters is taught.

In U.S. application Ser. No. 08/133,416; by: Kim et al.; filed Oct. 8, 1993, a key control system comprising generation of a first set of master keys and assigning the keys to a corresponding plurality of postage meters is taught. Keys may be changed by entry of a second key via encryption with a first key.

In U.S. application Ser. No. 08/772,739; by: Cordery; filed Dec. 23, 1996, a method for controlling keys used in the verification of encoded information generated by a transaction evidencing device and printed on a document is taught.

While the above methods are successful in achieving their intended purpose they are disadvantageous in that they are computationally complex, may produce certificates which are large and inflexible, and may require special hardware.

The following references contain information useful to a general understanding of elliptic curve encryption and certification of public keys.

Secure Hash Standard—FIPS PUB 180-1," Apr. 17, 1995.

Digital Signature Standard—FIPS PUB 186," May 19, 1994 and Change 1, Dec. 30, 1996.

ANSI X9.62, Elliptic Curve Digital Signature Algorithm Standard (ECDSA), Working Draft, Jan. 15, 1997.

ISO/IEC 9594-8 (1995). Information Technology—Open Systems Interconnection—The Directory: Authentication Framework."

PKCS #10: Certification Request Syntax Standard, An RSA Laboratories Technical Note," Version 1.0, December 1993.

Another method of key certification based upon elliptic curve public key encryption technology has been developed by the Certicom Corporation. (The use of elliptic curve encryption technology is known and a more detailed description of its use, beyond what is given below in the context of certification of public keys, is not required for an understanding of the subject invention.)

Elliptic curve encryption is an example of a cryptographic algorithm based on application of an binary additive operator to points in a finite group. In elliptic curve encryption a finite group of points [P] of order n is defined on an elliptic curve. A binary additive operator [+] (hereinafter sometimes "point addition") is defined on the group [P] such that P [+] P' is a point in [P]. A more detailed, graphical description of point addition is shown in FIG. 1. As is known to those skilled in the cryptographic art, disjoint curve 10 has the general form $y^2=x^3+ax+b$ defined over the finite Galois field $GF(p^m)$ where p is a prime number other than 2 and m is an integer. Over the Galois field $GF(2^m)$ the curve has the form $y^2+xy=x^3+ax+b$. It can be shown that groups of discrete points [P] of order n can be defined on curve 10, where n is preferably a number on the order of at least 50 decimal digits in order to provide sufficient security for encrypted information.

As is seen in FIG. 1 curve 10 is symmetric about the x axis so that for any point (x,y) on curve 10 its reflection around the x axis R(x,y)=(x,−y) is also on curve 10.

For two points P,P' in [P] it can be show that there exists a unique point R(P [+] P') which is a third point common to straight line 12 defined by P and P' and curve 10. P [+] P' is defined as R(R(P [+] P')).

FIG. 2 shows the special case for computation of P [+] P. Straight line 14 is defined as tangent to the closed portion of curve 10 and intersecting point P, and R(P [+] P) is defined as the second point common to line 14 and curve 10.

A second operation K*P (herein after sometimes "point multiplication") is defined as the application of [+] to K copies of a point P. FIG. 3 geometrically illustrates computation of 5*P by successive computation of the points P[+]P=2*P, 2*P[+]2*P=4*P, 4*P[+]P=5*P. Point multiplication is the basic operation underlying elliptic curve encryption and has the property that computation of K from knowledge of the group [P], a particular point P, and K*P is hard.

By "hard" as used herein in regard to computation is meant a computation wherein the time required increases faster than the order of the operands (log n) and preferably exponentially or faster with log n. This means that where K is of order n, the order of [P], and n is chosen large enough the cost, in time or money, of computing K from knowledge of the definition of [P], P, and K*P can be made arbitrarily large while the cost of other computations relating to encryption or decryption remains relatively low and practicable. Of course those skilled in the encryption art will recognize that, even though encryption and decryption can in principle be carried out by manual computation, the possibly of an attack on an encryption scheme using modem computer technology requires that, in practice, the order n be so great that even the relatively easy computations must be carried out by automated encryption stations; e.g. special purpose, or specially programmed general purpose, digital processing systems.

Point multiplication has been described in terms of the group represented by point addition on a discrete elliptic curve. In other embodiments the subject invention can be implemented using any group representation where determining K is hard given the point P and the point formed by combining K copies of point P by repeated application of the group additive point operation. Accordingly, unless otherwise stated the terms "point P and group [P]" as used herein are intended to include any elements, e.g. integers, functions, permutations, etc, as well as spatial points, for which a binary operation and corresponding group having the necessary properties as described above can be defined.

In elliptic curve encryption a user U has a private $Key_u$ and a corresponding public $Key_u$*P; where P is a point in [P]. P is published or publicly known. To generate a certified public key in accordance with the above mentioned Certicom encryption scheme user U (i.e. a station operated by user U) generates and keeps secret a random number $r_U$; and computes and sends to a certifying authority CA the point $r_U$*P. Certifying authority CA has a private $Key_{CA}$ and a public key $Key_{CA}$*P Upon receipt of $r_U$*P authority CA generates a random number $r_{CA}$ and computes and publishes a certificate including a point, $r_U$*P [+] $r_{CA}$*P, wherein $r_{CA}$ is a random number generated by the CA (i.e. by the CA station). Authority CA, which is presumed to have the capability to directly determine the identity or characteristics of user U, also generates information $ID_U$ about U includes $ID_U$ in the certificate. Certifying Authority CA then returns an integer derived from the CA's private key and the certificate to the user station which uses that integer to compute key $Key_u$ in such a manner that a party communicating with user U can compute $Key_U$*P from the certificate and the certifying authority's public key $Key_{CA}$; providing evidence that the certifying authority has linked user U, $Key_U$*P, and $ID_U$.

The above described certification scheme is believed to be advantageous in that it is computationally simpler, produces smaller certificates, and does not require special secure hardware. However it does not address the situation where a party communicating with a user may need assurance that more than one authority has certified the public key of a user. For example a Post Office which wishes to verify encrypted metered mail may need assurance that the putative public key of a meter has been certified by the meter manufacturer as well as one or more agencies of the USPS Accordingly it is an object of the subject invention to provide a method for controlling, and distributing information among, encryption stations for a user and a plurality of certifying authorities to publish related information such that a party communicating with the user can determine the users public key with assurance that the key has been certified by each of the authorities.

BRIEF SUMMARY OF THE INVENTION

The above object is achieved and the disadvantages of the prior art are overcome in accordance with subject invention which includes a method for controlling, and distributing information among, a plurality of stations, one of said stations being a user station operated by a user U to generate a private encryption key $Key_U$ and others of said stations being certifying stations operated by a plurality of certifying authorities for publishing related information, so that a corresponding public key $Key_U$*P of said user U can be determined by a party communicating with said user U from said published related information with assurance that said public key $Key_U$*P has been certified by each of said plurality of certifying authorities CA; programmable apparatus for carrying out the method, and portable data storage media for storing signals representative of program code for controlling the apparatus to carry out the functions said method. In accordance with the method of the subject invention the stations perform the steps of defining a finite group [P] with a binary operation [+] and publishing a point P in said group; and defining and publishing a binary operation K*P, where K is an integer and P is a point in said group, such that K*P is a point in said group computed by applying said operation [+] to K copies of said point P, and computation of K from knowledge of the definition of said group [P], said point P, and K*P is hard. One of the certifying stations is controlled to publish a certificate $CERT_u$ for said user U, wherein;

$CERT_U = (r_U + \text{sum}(r_{CAi}))*P$; and wherein $r_U$ is a random integer known only to said user U and sum($r_{CAi}$) is a sum of a plurality of random integers $r_{CAi}$, an ith one of said certifying stations generating an ith one of said random integers $r_{CAi}$. Another one of the certifying stations is controlled to publish a message M. The certifying stations also generate a plurality of integers $I_i$, and send at least the sum of integers $I_i$ to said user station, wherein;

$$I_i = r_{CAi} + H(M) Key_{CAi};\text{ and wherein}$$

H(M) is an integer derived from said message M in accordance with a publicly known algorithm H, and $r_{CAi}$ is one of said random integers generated by, and $Key_{CAi}$ is a private key of an ith one of said certifying authorities CA. A public key $Key_{CAi}*P$ is published in any convenient manner for each of said certifying authorities CA; the user station is controlled to compute a private key $Key_U$, wherein $$Key_U = r_U + \text{sum}(I_i) = r_U + \text{sum}(r_{CAi}) + \text{sum}(H(M) Key_{CAi}).$$

A party wishing to communicate with the user then can compute said user's public key $Key_U*P$ as $$Key_U*P = CERT_U + H(M)*\text{sum}_{[+]}(Key_{CAi}*P) = (r_U + \text{sum}(r_{CAi}))*P + \text{sum}(H(M) Key_{CAi})*P$$

from knowledge of H, M, [P], said public keys $Key_{CAi}*P$, and $CERT_U$.

In accordance with an aspect of the subject invention the publicly known manner for deriving an integer from said published information comprises applying a hashing function to said message M.

In accordance with another aspect of the subject invention the message M includes information $ID_U$ identifying or characterizing said user U.

In accordance with another aspect of the subject invention the user station receives said random number $r_U$ from, and transmits said $Key_U$ to an apparatus for evidencing payment, said apparatus generating encrypted indicia as proof of payment.

In accordance with another aspect of the subject invention one of said certifying stations is a registration station used by a registration authority said registration authority having responsibility for verifying said user's identity and incorporating information $ID_u$ identifying or characterizing said user U.

In accordance with another aspect of the subject invention the apparatus comprises a postage meter for evidencing payment of postage.

In accordance with another aspect of the subject invention the registration authority is a supplier of said apparatus and another of said certifying stations is used by a postal service.

In accordance with another aspect of the subject invention the group [P] is defined on an elliptic curve.

In accordance with another aspect of the subject invention the message M includes information tying said user's public key $Key_U*P$ to said information $ID_U$.

In accordance with still another aspect of the subject invention a public key of a user is certified by a plurality of certifying authorities, each of said certifying authorities having a published public key and a corresponding private key, by a method wherein said certifying authorities provide said user with integers, each of said integers being a first function of one of said private keys for a corresponding one of said authorities; said user computes a private key as a second function of said integers; and at least one of said certifying authorities publishes related information; wherein said first function, said second function and said published related information are chosen so that a party communicating with said user can compute said user public key, corresponding to said computed private key, by operating on said published related information with a summation of said published public keys of said authorities.

In accordance with still yet another aspect of the subject invention the user employs an apparatus for evidencing payment which generates said random number $r_U$ and transmits $r_U*P$ to said user. The user then transmits said integers $I_i$ to said apparatus, said apparatus computing said private key by combining said integers $I_i$ with $r_U$, and generating encrypted indicia as proof of payment.

In accordance with still yet another aspect of the subject invention one of said certifying authorities is a registration authority, said registration authority having responsibility for verifying said user's identity and incorporating said information identifying or characterizing said user.

In accordance with still yet another aspect of the subject invention the registration authority is a supplier of said apparatus and another of said certifying authorities is a postal service.

DETAILED DESCRIPTION OF PREFERRED EMBODIMENTS OF THE INVENTION

Figure 1:
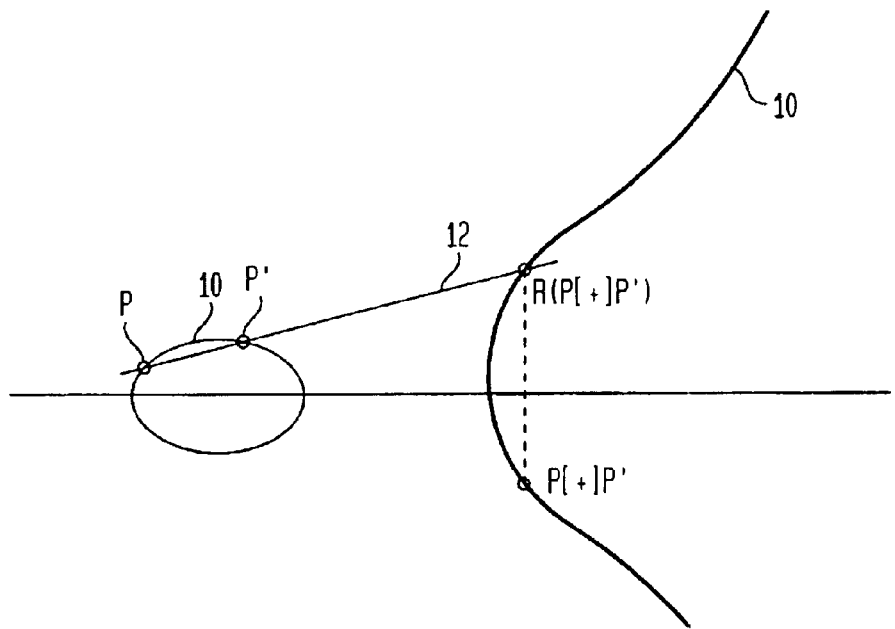
FIG. 1 is a graph illustrating the prior art operation of point addition of points P and P'.
Figure 2:
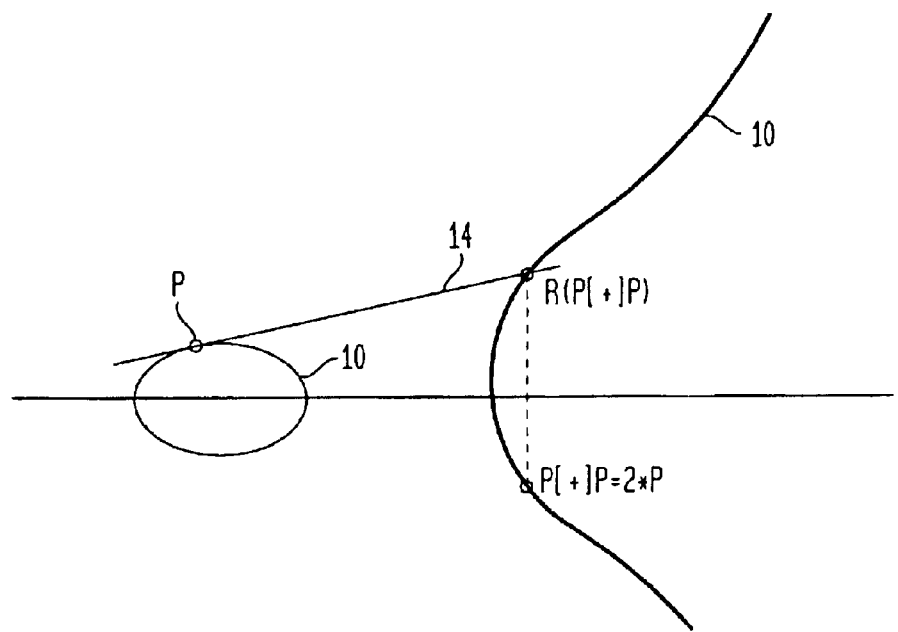
FIG. 2 is a graph illustrating the prior art operation of point addition of two copies of point P.
Figure 3:
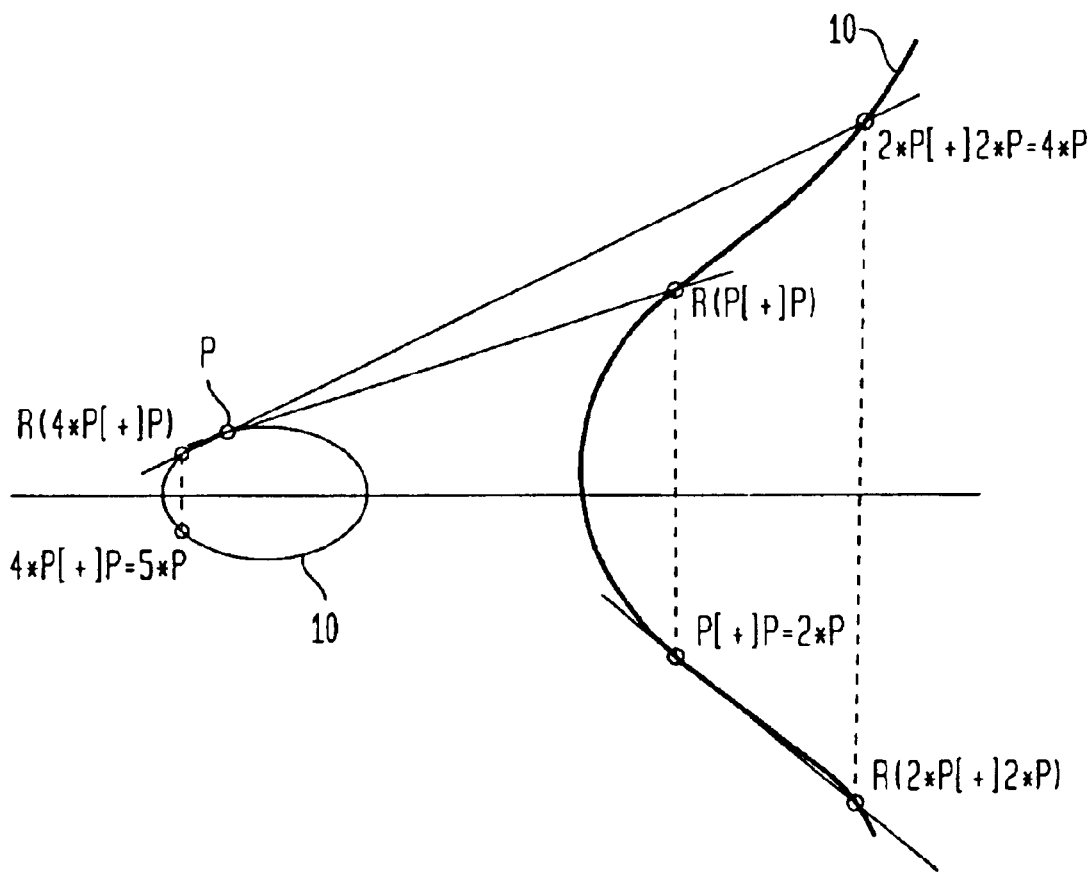
FIG. 3 is a graph illustrating the prior art operation of point multiplication of point P.
Figure 4:
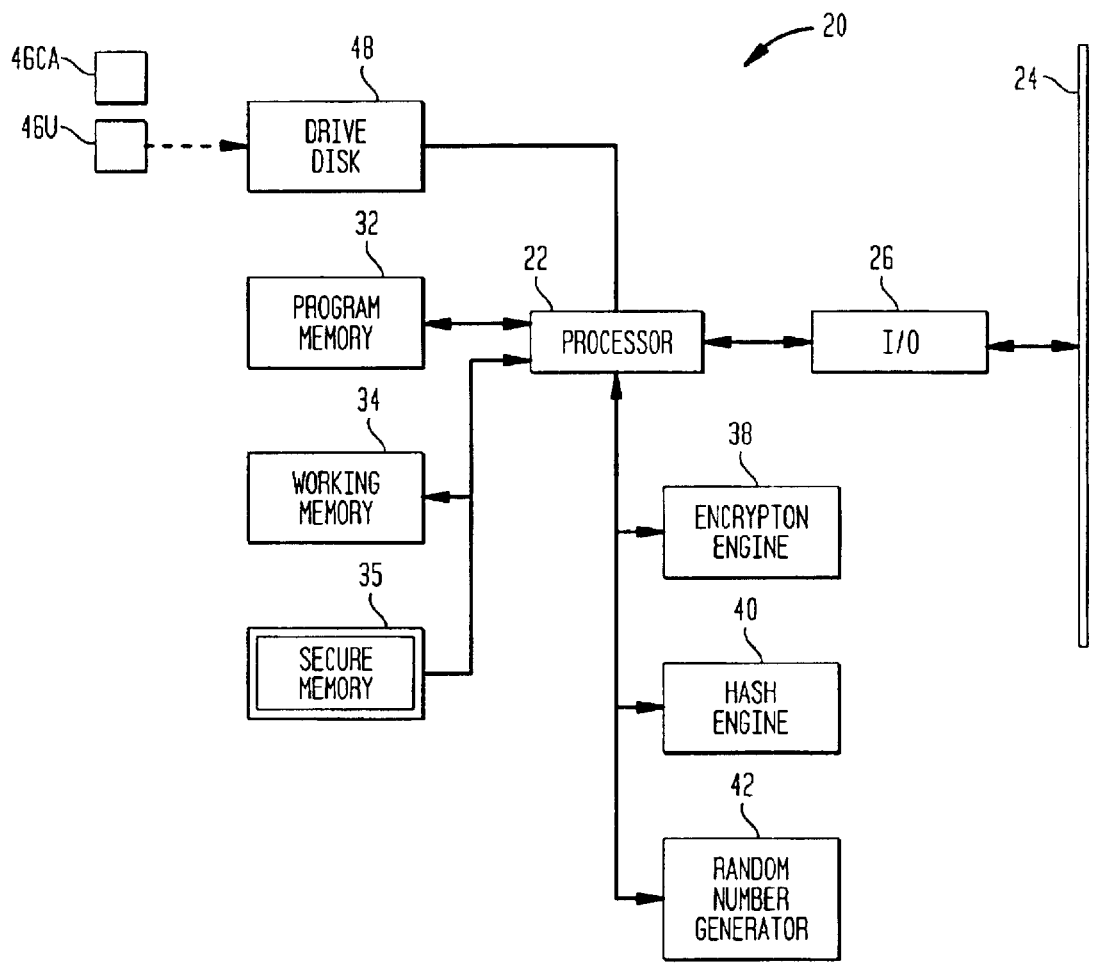
FIG. 4 is a schematic block diagram of a general encryption station which can be programmed to serve users or various certifying authorities.

FIG. 4 shows a general encryption station 20 which can be adapted to perform the functions required by a user or any of various certifying authorities. Station 20 includes processor 22 connected to data link 24 through I/O device 26. Data link 24 may be of any convenient kind, including but not limited to computer communication networks, telephone networks and dedicated lines, or can simply be the exchange of portable data storage media such as magnetic disks, with I/O device 26 being designed in a conventional manner to interface to link 24.

Processor 22 also communicates with program memory 32 to access program code to control station 20 to carry out functions of a user or one of various certifying authorities, and working memory 34 for temporary storage of data.

To increase security, station 20 also includes secure memory 35 for storing certain critical parameters, as will be described further below. Preferably memory 35 is secured against unauthorized access by conventional means known to those skilled in the art, which can include physical security such as be shielding and software based techniques such as passwords and encryption.

Processor 22 also communicates with, and controls as necessary: encryption engine 38 for carrying out point additions and point multiplications; hash engine 40 for performing a publicly known hash function, preferably the SHA-1 hash function promulgated by the National Security Agency; and random number generator 42 for generating random numbers. While the above described engines have been shown as dedicated devices for clarity of illustration, in other embodiments the encryption, hashing, and random number generation functions can be carried out by software routines stored in program memory 32.

Station 20 is preferably adapted to carry out the functions of a user or one of various certifying authorities by reading signals representative of an appropriate control program code recorded on portable media such as magnetic disks 46U or 46CA into program memory through disk drive 48 (Details of the operations of various certifying authorities and users in carrying out the method of the subject invention are described more fully below and development of control programs to control stations to function in such roles would be well within the ability of a person skilled in the cryptographic art.).

Figure 5:
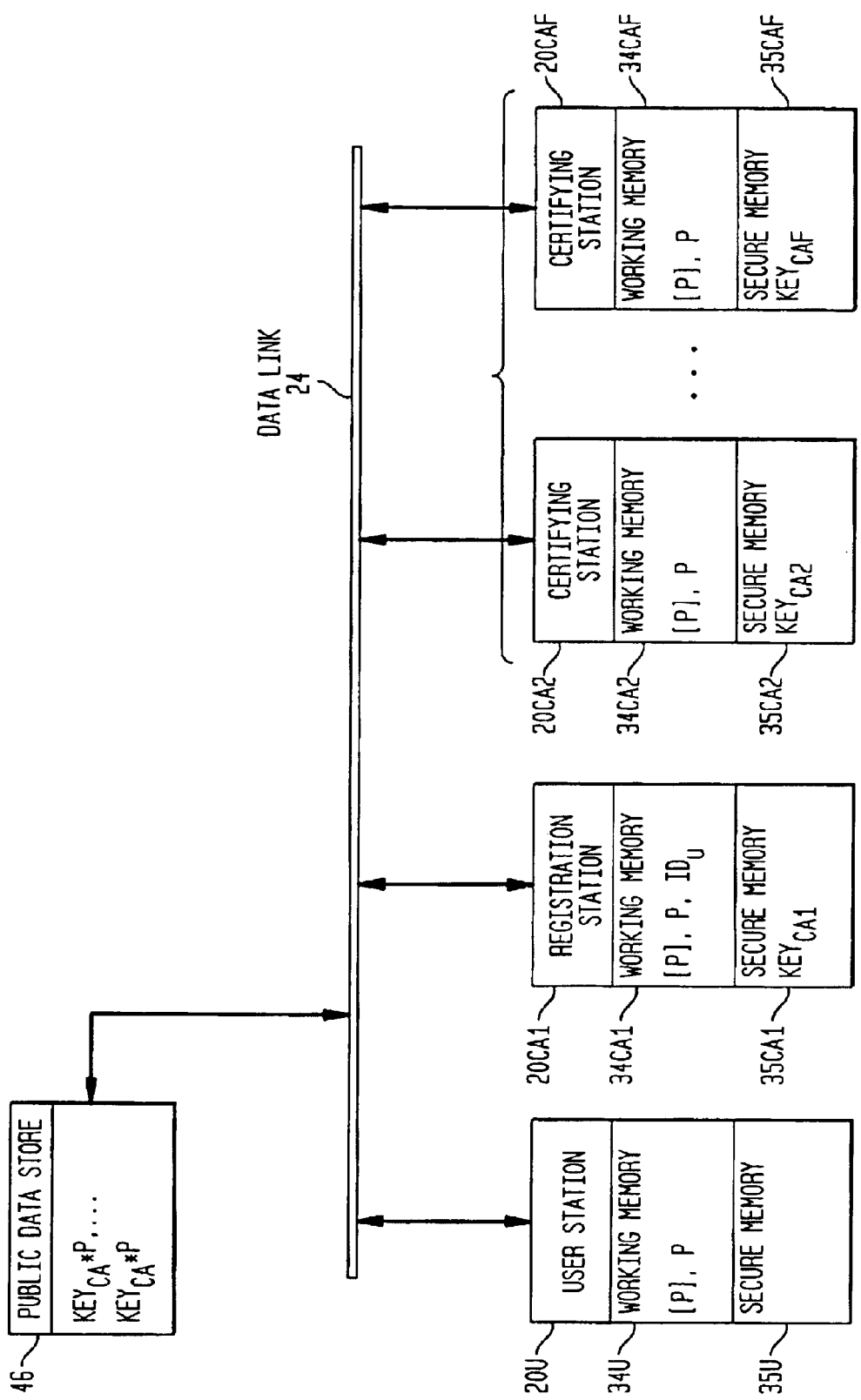
FIGS. 5–7 show a network of various encryption stations communicating over a data link in accordance with the method of the subject invention.
Figure 6:
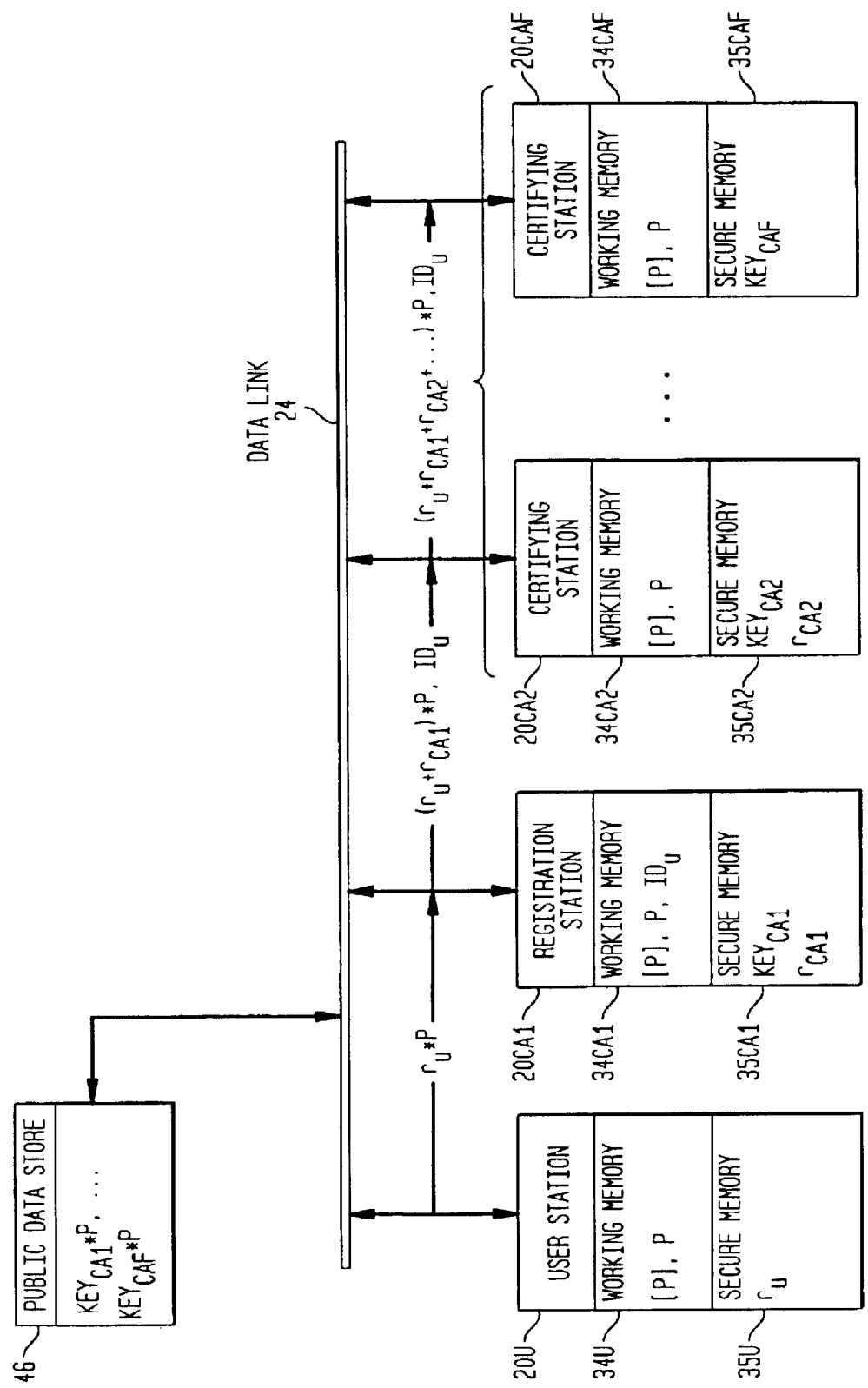
Figure 7:
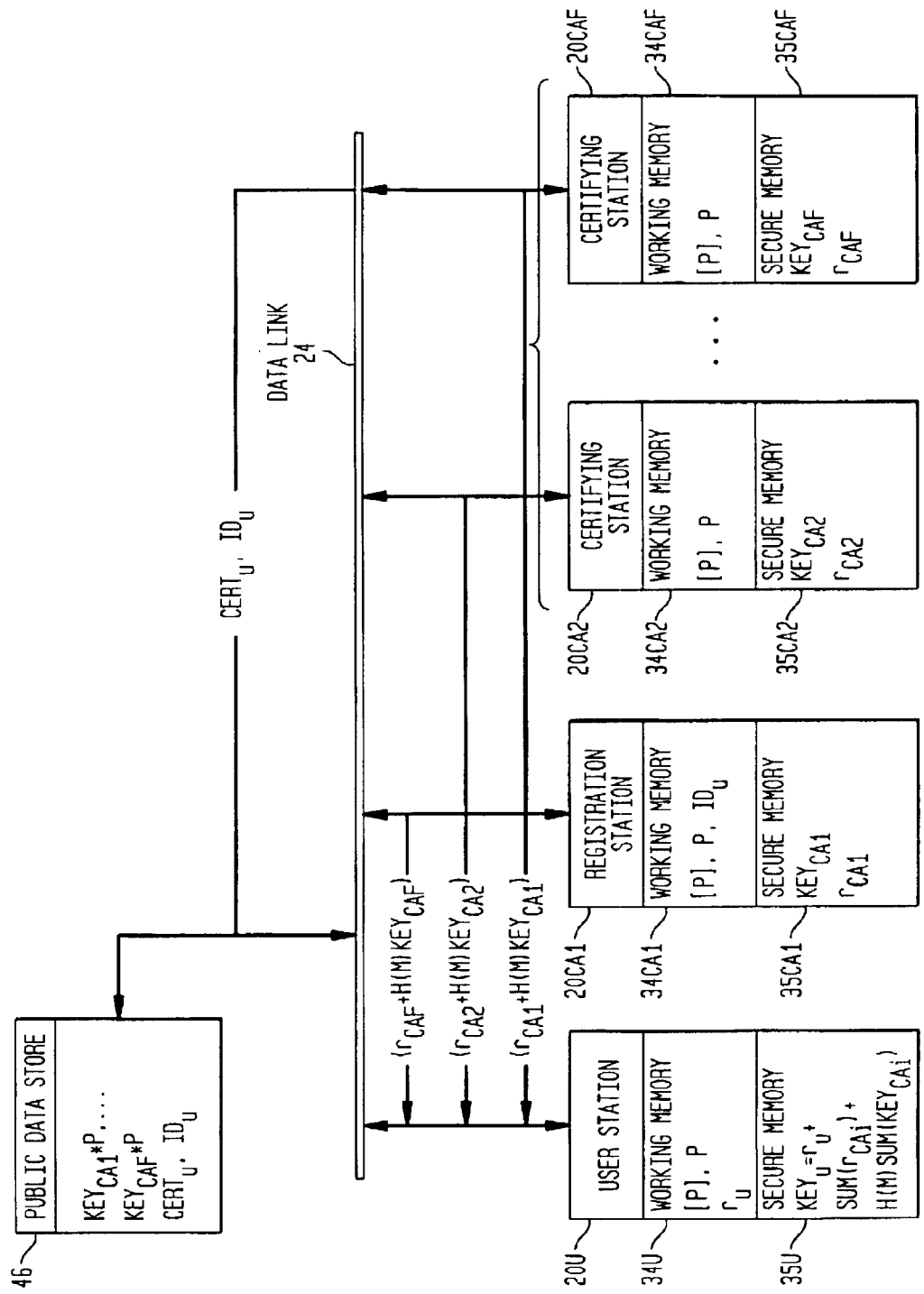

FIGS. 5–7 show a network of stations having substantially the architecture shown in FIG. 4 which communicate over data link 24 to carry out the method of the subject invention. Public data store 46 is also connected to link 24 to store data accessible to any party communicating over link 24.

Initially user station 20U, operated by user U, stores a description of a group [P] (i.e. information needed to carry out additive operation [+])and a particular, publicly known point P in its working memory 34U; a first certifying station 20CA1 (hereinafter sometimes registration station), operated by a first certifying authority (hereinafter sometimes registration authority), stores [P], P, and information $ID_u$ which identifies or characterizes user U in its working memory 34AC1; and private key $Key_{CA1}$ in secure memory 35CA1 plurality of other certifying stations 20CA2–20CAF, operated by a corresponding plurality of certifying authorities necessary to generate a certificate for user U, store [P], P in working memories 34CA2–34CAF and corresponding keys $Key_{CA2}$–$Key_{CAF}$ in secure memories 35CA2–35CAF; and public data store 46 stores public keys $Key_{CA1}*P$–$Key_{CAF}*P$.

In FIG. 6 user station 20U initiates the certification process by generating and storing a random number $r_U$ in secure memory 35U, computing the point $r_U*P$, and sending point $r_U*P$ to station 20CA1. Station 20CA1 is preferably operated by a registration authority who has responsibility for ascertaining the actual identity of user U. Station 20CA1 them generates and store a random number $r_{CA1}$ in secure memory 35CA1 and computes the point:

$$r_U*P[+]r_{CA1}*P=(r_U+r_{CA1})*P$$

and sends $(r_U+r_{CA1})*P$, $ID_U$ to station 20CA2 which similarly generates and stores a random number $r_{CA2}$ and computes a point $(r_U+r_{CA1}+r_{CA2})*P$. Assuming that all previous certifying stations will certify user U, final certifying station 20CAF will receive $(r_U+r_{CA1}+r_{CA2}+\ldots)*P$, $ID_U$. In the case where a certifying station cannot certify user U the station can enter an error routine to abort the certification process. Details of such an error routine form no part of the subject invention. In other embodiments of the invention, successive certifying stations can alter or amend information $ID_U$ to indicate user U's status.

Turning to FIG. 7 station 20CAF then generates and stores a random number $r_{CAF}$ in secure memory 35CAF and computes a point:

$$CERT_U=(r_U+r_{CA1}+r_{CA2}\ldots+r_{CAF})*P$$

and publishes message M:

$$M=CERT_U,ID_U$$

by sending M to public data store 46. Each certifying station 20CA1–20CAF then computes a hash H(M) of message M where H is a publicly known hashing function and is preferably the known SHA-1 function and then generates an integer $I_i$:

$$I_i=r_{CAi}+H(M)Key_{CAi}$$

for the ith one of said certifying stations, and sends integer $I_i$ to station 20U. Station 20U then computes private key $Key_U$:

$$Key_U=r_U+\text{sum}(I_i)=r_U+\text{sum}(r_{CAi})+\text{sum}(H(M)Key_{CAi}).$$

(In computing integers $I_i$ The expression of point the certificate $CERT_U$ is handled as an integer.)

A party communicating with user U can then compute user U's public key $Key_U*P$ as:

$$Key_U*P=CERT_U+H(M)*\text{sum}[_+](Key_{CAi}*P)=(r_U+\text{sum}(r_{CAi}))*P+\text{sum}(H(M)Key_{CAi})*P$$

from knowledge of H, M, said public keys KeyCAi*P, and $CERT_U$; wherein "sum(_)" represents summation by arithmetic addition and "$\text{sum}_{[+]}$(_)", summation by point addition. Since the computation of public key $Key_U*P$ requires the point summation of public keys $Key_{CA1}*P$–$Key_{CAF}*P$ the communicating party has assurance that $Key_U*P$ has been certified by each certifying authority.

Inspection of the above formulas for $Key_U$ and $Key_U*P$ shows them to be consistent for arbitrary values of H(M). The values specified in the preferred embodiment described above, $H(CERT_U, ID_U)$, are preferred since incorporation of $CERT_U$ into message M securely ties information $ID_U$ to $Key_U*P$ and hashing of message M is useful to prevent forgery of messages which will yield $Key_U*P$ but which contain different information $ID_U$. However if communications of certificates are secure any value derived in a publicly known manner may be used.

Figure 8:
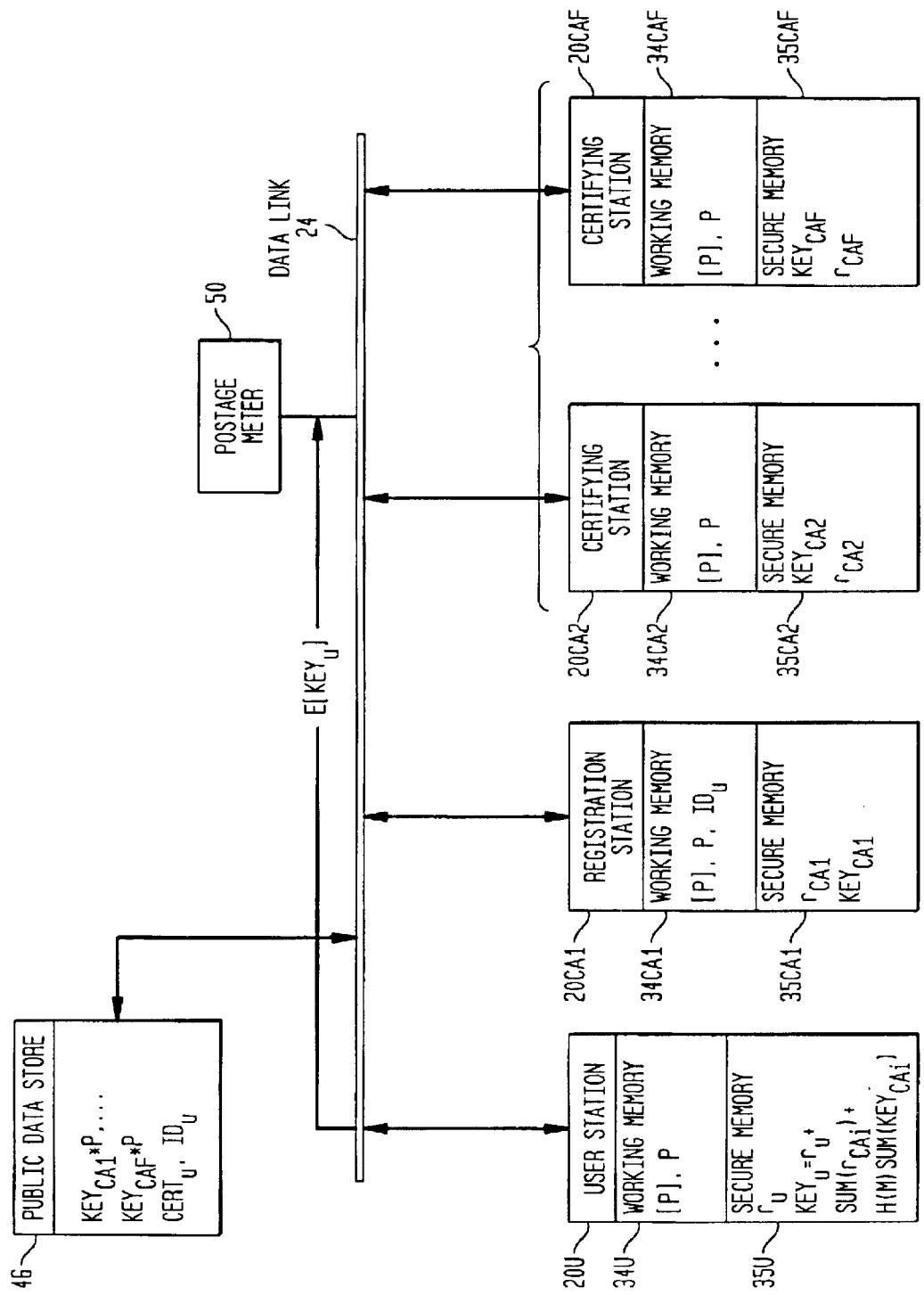
FIG. 8 shows a network of various encryption stations communicating over a data link to carry out the method of the subject invention and download a resulting private encryption key to a postage meter.

FIG. 8 shows another embodiment of the subject invention wherein user U downloads private key $Key_U$ to a postage meter 50 or other payment evidencing device for use in producing encrypted indicia as proof of payment of postage or the like. In this embodiment registration station 20CA1 is preferably operated by a vendor of meter 50 since the vendor will be in the best position to verify that user U's possession of meter 50 is authorized. Certificates would then be issued by one or more agencies of a postal service or other appropriate authority. In other embodiments a vendor may operate user station 20U to request certificates for meters to be delivered to customers. In still other embodiments a user can divide functions in generating a public key pair between a station and a subunit such as a postage meter. In such embodiments the meter would generate $r_U$ and a point $r_U*P$ and send the point to the station, which would communicate with certifying authority CA as described, and return a sum of integers Is to the meter which would compute private $Key_U$ as described above. This would minimize the computational and communications burden on the subunit while avoiding the security risk of transmitting the private key $Key_U$, In other embodiments of the subject invention certification can be carried out, substantially as described above, over other sets [E] for which an operation [op] exists such that I[op]E, where I is an integer, is an element of [E] and computation of I from knowledge of [E], E, and I[op]E is hard. For example the Digital Signature Algorithm is based on a subgroup of integers modulo a prime number p with binary operation being exponentiation. However, elliptic curves are preferred as computationally more efficient.

The embodiments described above and illustrated in the attached drawings have been given by way of example and illustration only. From the teachings of the present application those skilled in the art will readily recognize numerous other embodiments in accordance with the subject invention. In particular they will recognize that particular sequences of exchange of data among the various stations are not critical so long as computation of private and public keys is carried out in accordance with the subject invention. Accordingly, limitations on the subject invention are to be found only in the claims set forth below.

What is claimed is:

1. A method for controlling, and distributing information among, a plurality of stations, one of said stations being a user station operated by a user U to generate a private encryption key $Key_U$ and others of said stations being certifying stations operated by a plurality of certifying authorities for publishing related information, so that a corresponding public key $Key_U*P$ of said user U can be determined by a party communicating with said user U from said published related information with assurance that said public key $Key_U*P$ has been certified by each of said plurality of certifying authorities CA, said method comprising the steps of:

a) defining a finite group [P] with a binary operation [+] and publishing a particular point P in said group;

b) defining and publishing a binary operation K*p, where K is an integer and p is a point in said group, such that K*p, is a point in said group computed by applying said operation [+] to K copies of said point p, and computation of K from knowledge of the definition of said group [P], said point p, and K*p is hard;

c) controlling one of said certifying stations to publish a certificate $CERT_U$ for said user U, wherein;

$CERT_U=(r_U+sum(r_{CAi}))*P$; and wherein $r_U$ is a random integer known only to said user U and $sum(r_{CAi})$ is a sum of a plurality of random integers $r_{CAi}$, an ith one of said certifying stations generating an ith one of said random integers $r_{CAi}$;

d) controlling one of said certifying stations to publish a message M;

e) controlling said certifying stations to generate a plurality of integers $I_i$, and send at least $sum(I_i)$ to said user station, wherein;

$I_i=r_{CAi}+H(M)Key_{CAi}$; and wherein

H(M) is an integer derived from said message M in accordance with a publicly known algorithm H, and $r_{CAi}$ is one of said random integers generated by, and $Key_{CAi}$ is a private key of, an ith one of said certifying authorities CA;

f) publishing a public key $Key_{CAi}*P$ for each of said certifying authorities CA; and g) controlling said user station to compute a private key $Key_U$, wherein $Key_U=r_U+sum(I_i)=r_U+sum(r_{CAi})+sum(H(M)Key_{CAi})$; whereby h) said communicating party can compute said user's public key $Key_U*P$ as $Key_U*P=CERT_U+H(M)*sum[_+](Key_{CAi}*P)=(r_U+sum(r_{CAi}))*P+sum(H(M)Key_{CAi})*P$ from knowledge of H, M, [P], said public keys $Key_{CAi}*P$, and $CERT_U$.

2. A method as described in claim 1 wherein said publicly known manner for deriving an integer from said published information comprises applying a hashing function to said message M.

3. A method as described in claim 2 wherein said message M includes information $ID_U$ identifying or characterizing said user U.

4. A method as described in claim 1 wherein said message M includes information $ID_U$ identifying or characterizing said user U.

5. A method as described in claim 1 wherein said user station transmits said user key $Key_U$ to an apparatus for evidencing payment, said apparatus generating encrypted indicia as proof of payment.

6. A method as described in claim 5 wherein one of said certifying stations is a registration station used by a registration authority said registration authority having responsibility for verifying said user's identity and incorporating information $ID_U$ identifying or characterizing said user U.

7. A method as described in claim 5 wherein said apparatus comprises a postage meter for evidencing payment of postage.

8. A method as described in claim 7 wherein said registration authority is a supplier of said apparatus and another of said certifying stations is used by a postal service.

9. A method as described in claim 1 wherein one of said certifying stations is a registration station used by a registration authority said registration authority having responsibility for verifying said user's identity and incorporating information IDU identifying or characterizing said user U.

10. A method as described in claim 1 wherein said group [P] is defined on an elliptic curve.

11. A method as described in claim 1 wherein said message M includes information tying said user's public key $Key_U*P$ to said information $ID_U$.

12. A method for certification of a public key of a user by a plurality of certifying authorities, each of said certifying authorities having a published public key and a corresponding private key, said method comprising the steps of:

a) said certifying authorities providing said user with integers, each of said integers being a first function of one of said private keys for a corresponding one of said authorities;

b) said user computing a private key as a second function of said integers; and c) at least one of said certifying authorities publishing related information; wherein d) said first function, said second function and said published related information are chosen so that a party communicating with said user can compute said user public key, corresponding to said computed private key, by operating on said published related information with a summation of said published public keys of said authorities.

13. A method as described in claim 12 wherein said published related information includes information identifying or characterizing said user.

14. A method as described in claim 12 wherein said user transmits said computed private key to an apparatus for evidencing payment, said apparatus generating encrypted indicia as proof of payment.

15. A method as described in claim 14 wherein one of said certifying authorities is a registration authority, said registration authority having responsibility for verifying said user's identity and incorporating said information identifying or characterizing said user.

16. A method as described in claim 15 wherein said registration authority is a supplier of said apparatus and another of said certifying authorities is a postal service.

17. A method as described in claim 14 wherein said apparatus comprises a postage meter for evidencing payment of postage.

18. A method as described in claim 12 wherein one of said certifying authorities is a registration authority, said registration authority having responsibility for verifying said user's identity and incorporating said information identifying or characterizing said user.

19. A method for controlling and distributing information among a plurality of certifying stations used by a plurality of certifying authorities for publishing related information so that a public key $Key_U$ of a user U can be determined by a party communicating with said user U from said published related information with assurance that said public key $Key_U$ has been certified by each of said plurality of certifying authorities CA, said method comprising the steps of:

a) defining a finite group [P] with a binary operation [+] and publishing a particular point P in said group;

b) defining and publishing a binary operation K*p, where K is an integer and p is a point in said group, such that K*p, is a point in said group computed by applying said operation [+] to K copies of said point p, and computation of K from knowledge of the definition of said group [P], said point p, and K*p is hard;

c) for each of said authorities storing in an corresponding one of said certifying stations a private encryption key $Key_i$, where $Key_i$ is a key for an ith one of said certifying authorities;

d) publishing a corresponding public encryption key $Key_i$*P for each one of said certifying authorities;

e) controlling one of said certifying stations to publish a certificate $CERT_U$ for said user U, wherein;

$CERT_U = (r_U + sum(r_{CAi}))*P$; and wherein $r_U$ is a random integer known only to said user U and sum($r_{CAi}$) is a sum of a plurality of random integers $r_{CAi}$, an ith one of said certifying stations generating an ith one of said random integers $r_{CAi}$;

f) controlling said one of said certifying stations to publish a message M; and g) controlling said certifying stations to send to said user station a at least the sum of a plurality of integers $I_i$, wherein;

$I_i = r_{CAi} + H(M)Key_{CAi}$; and wherein

H(M) is an integer derived from said message M in accordance with a publicly known algorithm H, and $Key_{CAi}$ is a private key of, an ith one of said certifying authorities CA; whereby h) said user station can compute a private key $Key_U$, wherein $Key_U = r_U + sum(I_i) = r_U + sum(r_{CAi}) + sum(H(M)Key_{CAi})$; and whereby i) said communicating party can compute said user's public key $Key_U$*P as $Key_U*P = CERT_U[+]H(M)*sum_{[+]}(Key_{CAi}*P) = (r_U + sum(r_{CAi}))*P[+] sum(H(M)Key_{CAi})*P$ from knowledge of H, M, [P], said public keys $Key_{CAi}$*P, and $CERT_U$.

20. Data processing apparatus including a programmable processor programmed to control said apparatus as one of a plurality of certifying stations used by a plurality of certifying authorities for distributing information among said certifying stations and publishing related information, so that a public key $Key_U$*P of a user U can be determined by a party communicating with said user U from said published related information with assurance that said public key $Key_U$*P of said user U has been certified by each of said plurality of certifying authorities, each of said certifying stations storing a private encryption key $Key_{CAi}$, where $Key_{CAi}$ is a key for an ith one of said certifying authorities and a corresponding public encryption key $Key_{CAi}$*P for each one of said certifying authorities CA being publicly known, said processor being programmed control said apparatus to:

a) communicate with and receive from said user station and other certifying stations a point in said group [P], either as a single point or as one or more points to be summed to form said received point, said received point being equal to:

$(r_U + sum(r_{CAi}))*P$; wherein $r_U$ is a random integer known only to said user U, P is a particular, published point in [P] and sum($r_{CAi}$) is a sum of a plurality of random integers $r_{CAi}$, an ith one of said other certifying stations generating an ith one of said random integers $r_{CAi}$;

b) generate a final random number $r_{CAF}$;

c) controlling said one of said certifying stations to publish a certificate $CERT_U$ for said user U, wherein;

$CERT_U = (r_U + sum(r_{CAi}) + r_{CAF})*P$ d) controlling said one of said certifying stations to publish a message M; wherein e) said certifying stations, including said one station, send to said user station a plurality of integers $I_i$, wherein;

$I_i = r_{CAi} + H(M)Key_{CAi}$; and wherein

H(M) is an integer derived from said message M in accordance with a publicly known algorithm H, and $r_{CAi}$ is one of said random integers $r_{CAi}$ generated by, and $Key_{CAi}$ is a private key of an ith one of said certifying authorities; whereby f) said user station can compute a private key $Key_U$, wherein $Key_U = r_U + sum(I_i) = r_U + sum(r_{CAi}) + sum(H(M)Key_{CAi})$; and whereby g) said communicating party can compute said user's public key $Key_U$*P as $Key_U*P = CERT_U[+]H(M)*sum_{[+]}(Key_{CAi}*P) = (r_U + sum(r_{CAi}))*P[+] sum(H(M)Key_{CAi})*P$ from knowledge of H, M, [P], said public keys $Key_{CAi}$*P, and $CERT_U$.

* * * * *